United States Patent
Wu et al.

(10) Patent No.: US 9,800,527 B2
(45) Date of Patent: Oct. 24, 2017

(54) METHOD AND APPARATUS FOR DISPLAYING IMAGE

(71) Applicant: TENCENT TECHNOLOGY (SHENZHEN) COMPANY LIMITED, Shenzhen (CN)

(72) Inventors: Jiawen Wu, Shenzhen, CA (US); Dongfang Hong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/030,392

(22) PCT Filed: Sep. 23, 2014

(86) PCT No.: PCT/CN2014/087164
§ 371 (c)(1),
(2) Date: Apr. 19, 2016

(87) PCT Pub. No.: WO2015/058607
PCT Pub. Date: Apr. 30, 2015

(65) Prior Publication Data
US 2016/0255022 A1 Sep. 1, 2016

(30) Foreign Application Priority Data
Oct. 21, 2013 (CN) .......................... 2013 1 0496524

(51) Int. Cl.
*G06F 15/16* (2006.01)
*H04L 12/58* (2006.01)
(Continued)

(52) U.S. Cl.
CPC .......... *H04L 51/04* (2013.01); *G06F 3/04845* (2013.01); *H04L 51/10* (2013.01);
(Continued)

(58) Field of Classification Search
CPC ............. G06Q 10/107; G06Q 20/0423; G06Q 20/342; G06Q 30/01; H04L 63/10; G06T 17/00
(Continued)

(56) References Cited

U.S. PATENT DOCUMENTS

| 7,035,803 B1 | 4/2006 | Ostermann et al. |
| 7,184,047 B1 * | 2/2007 | Crampton ............... G06T 17/00 345/473 |

(Continued)

FOREIGN PATENT DOCUMENTS

| CN | 101098241 A | 1/2008 |
| CN | 101945223 A | 1/2011 |

(Continued)

OTHER PUBLICATIONS

International Search Report and Written Opinion, International application No. PCT/CN2014/087164, mailed Dec. 26, 2014.

(Continued)

*Primary Examiner* — Dustin Nguyen
(74) *Attorney, Agent, or Firm* — Marshall, Gerstein & Borun LLP (57) ABSTRACT

The present disclosure relates to image processing technologies, and provides a method for displaying an image, comprising: receiving a picture uploaded by a client; intercepting a first image and a second image from the picture; and associating the intercepted first image and the intercepted second image with a network account of a user; when monitoring that the network account is logged in, pushing the first image and the second image as content of a data card of the network account to a client for displaying. The solution of the present invention can mix the avatar of the data card and the background image of the data card together, and display more information related to the avatar of the data card by the background image of the data card.

12 Claims, 6 Drawing Sheets

(51) Int. Cl.
*G06F 3/0484* (2013.01)
*H04L 29/08* (2006.01)
*H04L 12/18* (2006.01)

(52) U.S. Cl.
CPC ............ H04L 67/26 (2013.01); H04L 67/306 (2013.01); H04L 12/1827 (2013.01); H04L 51/38 (2013.01)

(58) Field of Classification Search
USPC .......................................... 345/473; 382/229
See application file for complete search history.

(56) References Cited

U.S. PATENT DOCUMENTS

| | | | |
|---|---|---|---|
| 8,688,579 B1* | 4/2014 | Ethington | G06Q 20/0425 |
| | | | 705/35 |
| 9,325,709 B2* | 4/2016 | Beckmann | H04L 63/10 |
| 2004/0001223 A1 | 1/2004 | Tanaka | |
| 2006/0052091 A1 | 3/2006 | Onyon et al. | |
| 2010/0238325 A1 | 9/2010 | Hoshino et al. | |
| 2012/0066613 A1* | 3/2012 | Berger | G06Q 30/01 |
| | | | 715/751 |
| 2013/0022284 A1* | 1/2013 | Zheng | G06Q 10/107 |
| | | | 382/229 |
| 2014/0076965 A1* | 3/2014 | Becorest | G06Q 20/342 |
| | | | 235/380 |

FOREIGN PATENT DOCUMENTS

| | | |
|---|---|---|
| JP | 2003-316894 A | 11/2003 |
| JP | 2007-124451 A | 5/2007 |

OTHER PUBLICATIONS

Extended European Search Report in EP Application No. 14854933.0 dated Sep. 28, 2016, 8 pages.
Office Action from Japanese Application No. 2016-525038 dated Apr. 25, 2017.

* cited by examiner

METHOD AND APPARATUS FOR DISPLAYING IMAGE

PRIORITY STATEMENT

This application claims the benefit of Chinese Patent Application No. 201310496524.X, filed on Oct. 21, 2013, the disclosure of which is incorporated herein in its entirety by reference.

FIELD

The present disclosure relates to image processing technologies, more particularly to a method and apparatus for displaying an image.

BACKGROUND

With the rapid development of internet, especially of mobile internet, more and more users may use instant messaging (IM) software to make friends, chat, etc. For the IM software (e.g., QQ software), a data card is generally configured to introduce the user's data. In order to better show personally and satisfy different users' demands, current data card may also provide the functions of updating an avatar of the data card and background of the data card.

SUMMARY

Examples of the present disclosure provide a method for displaying an image.

In a first aspect, a method for displaying an image provided by examples of the present disclosure includes:

receiving a picture uploaded by a client;

intercepting a first image and a second image from the picture;

associating the intercepted first image and the intercepted second image with a network account of a user; when monitoring that the network account is logged in, pushing the first image and the second image as content of a data card of the network account to a client for displaying.

In a second aspect, an apparatus provided by examples of the present disclosure includes:

a picture receiving unit, configured to receive a picture uploaded by a client;

an image intercepting unit, configured to intercept a first image and a second image from the picture received by the image receiving unit;

a pushing unit, configured to associate the first image and the second image intercepted by the image intercepting unit with the network account of the user; when monitoring that the network account is logged in, push the first image and the second image as content of the data card of the network account to the client for displaying.

BRIEF DESCRIPTION OF THE DRAWINGS

For a better understanding of the present disclosure, accompanying drawings to be used in description of the examples or the prior art will be simply introduced hereinafter. Obviously, the accompanying drawings to be described hereinafter are only some examples of the present disclosure. Those skilled in the art may obtain other drawings according to these accompanying drawings without creative labor.

DETAILED DESCRIPTION

Figure 1:
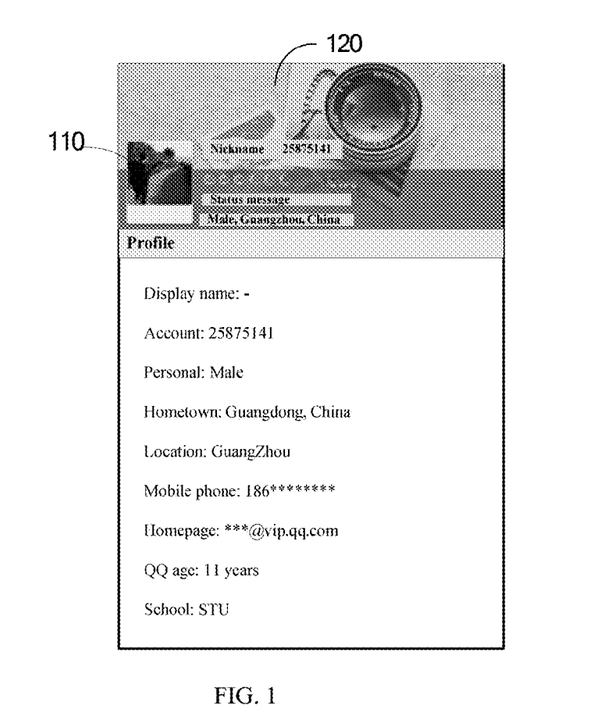
FIG. 1 is a schematic diagram displaying an avatar of the data card and a background image of the data card in the prior art.

In current process of updating an avatar of the data card and background of the data card, the user may select a self-defined avatar of the data card, but the background of the data card is only be selected from fixed templates provided by the IM software. As shown in FIG. 1, the avatar of the data card 110 and the background of the data card 120 show different contents of two irrelevant images. As a result, the avatar of the data card and the background of the data card cannot be mixed together, and the background of the data card cannot display information related to the avatar of the data card.

To make the objectives, technical solutions, and advantages of the present disclosure more comprehensible, the following further describes the present disclosure in detail with reference to the accompanying drawings and examples. It would be understood that the examples described herein are only used to construe the present disclosure, but not to limit the present disclosure.

FIRST EXAMPLE

Figure 2:
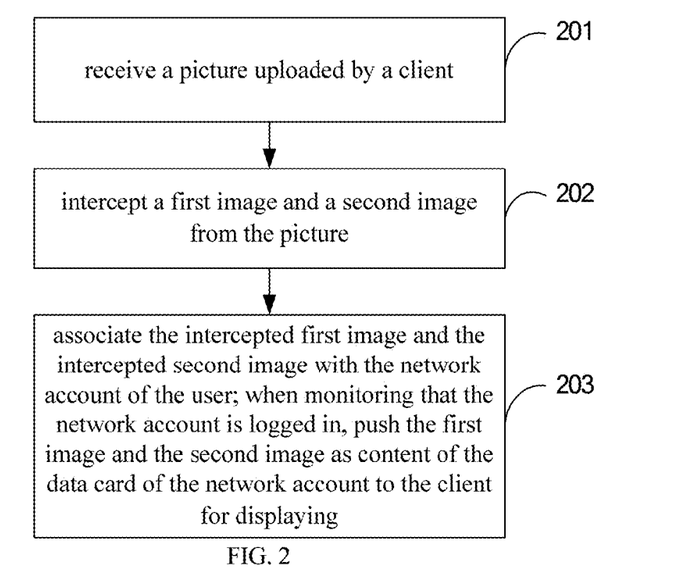
FIG. 2 is a flowchart diagram illustrating a method for displaying an image according to a first example of the present disclosure.

FIG. 2 is a flow diagram illustrating a method for displaying an image according to a first example of the present disclosure. As shown in FIG. 2, the method may include the following operations.

In Block 201, receive a picture uploaded by a client.

Figure 3A:
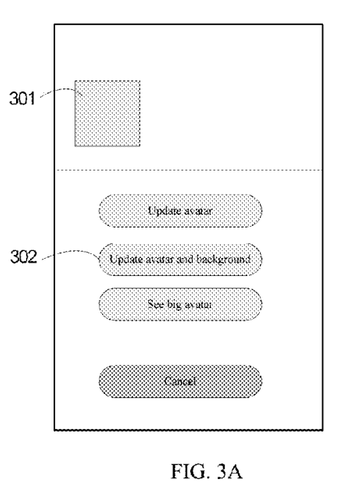
FIG. 3A and FIG. 3B are schematic diagrams illustrating a client obtaining an uploaded picture according to the first example of the present disclosure.

Schematically, after the client receives an instruction of updating an avatar and a background given by a user, obtain the needed picture through a camera of the client, and upload the picture obtained by shooting to a server. As shown in FIG. 3A, click the avatar 301, and then choose the button of "update avatar and background"; after clicking the button of "update avatar and background", as shown in FIG. 3B, use the camera to shoot according to a preview area 303 and at the same time remind the user to pay attention to the image shown in the avatar 301', and click the camera button 304 to obtain the picture.

Optionally, in order to accommodate different terminals, for example, a personal computer (PC), in the example, the client employs a 3:4 vertical shooting mode for shooting.

Figure 3B:
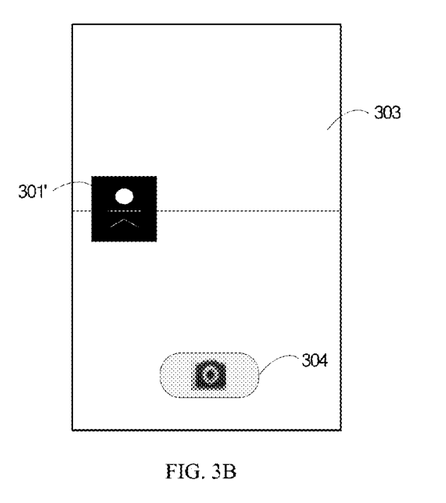

It should be noted that, the way of obtaining the picture by the client in FIG. 3A and FIG. 3B is just one exemplary example. Those skilled in the art would understand that the example is only used to construe the present disclosure, but not to limit the protection scope of the present disclosure. Any other ways of obtaining the needed picture should be within the protection scope of the present disclosure. For example, the example may preset a button on the client to obtain the picture, or directly set an instruction to obtain the picture, such as an instruction by sliding clockwise or anticlockwise on the touch screen, or combination of digits and/or characters in the keyboard. After the instruction of obtaining the picture by the user clicking the button or sent by the user is received, shoot the picture via the camera.

In Block 202, intercept a first image and a second image from the picture.

In the example, after receiving the picture uploaded by the client, the server stores the picture, and intercepts the first image and the second image from the picture, which may be the original picture uploaded by the client, or may be a copy of the uploaded picture.

Preferably, the first image is the avatar of the data card, and the second image is the background image of the data card.

Figure 4:
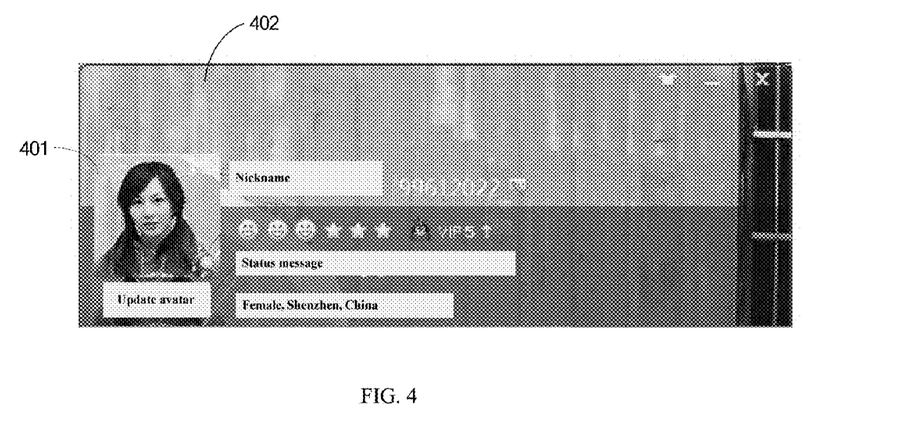
FIG. 4 is a schematic diagram illustrating displaying an avatar of the data card and a background image of the data card in dislocation according to the first example of the present disclosure.

Further, after the avatar of the data card is updated by the user, a problem of displaying the avatar of the data card and the background image of the data card in dislocation may be caused by different layout of the data card possibly available in different versions of the software. As shown in FIG. 4, due to different resolution ratios of the background image in different versions of QQ software, the avatar 401 is displaced in contrast to the location of the avatar image within the background image. In order to solve such problem, the example also includes:

according to typesetting and layout of the data card in different versions of the software used by the network account, such as the relative location between the avatar of the data card and the background image of the data card, intercepting the corresponding second image from the picture.

Figure 5:
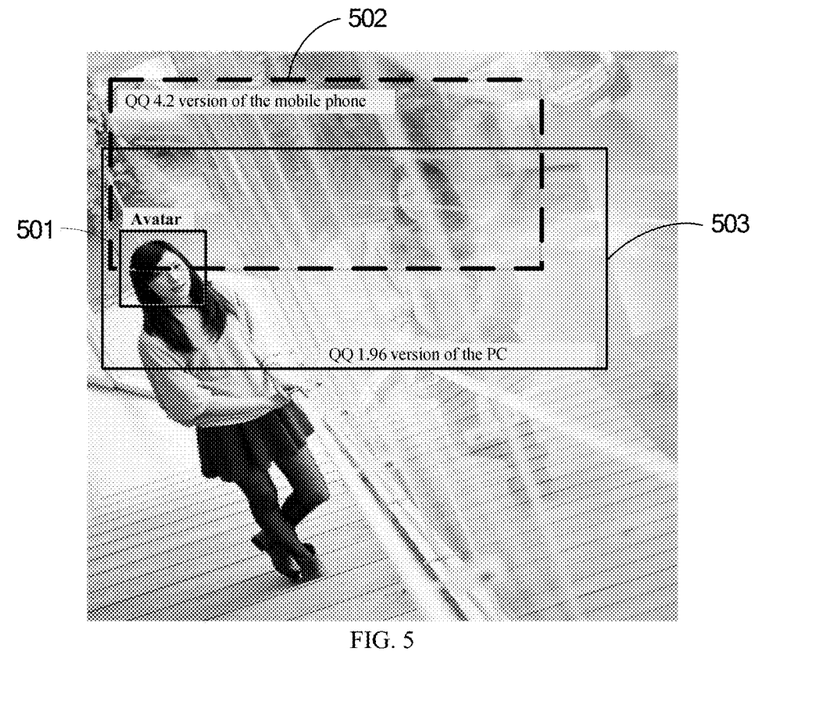
FIG. 5 is a schematic diagram illustrating intercepting a second image based on typesetting and layout of a data card in different versions of software according to the first example of the present disclosure.

As shown in FIG. 5, the dashed-line box 502 is the second image intercepted according to typesetting and layout of the data card in the QQ 4.2 version of the mobile phone, and the solid-line box 503 is the second image intercepted according to typesetting and layout of the data card in the QQ 1.96 version of the PC. With respect to the location of the avatar of the data card 501, the intercepted second image in box 502 and box 503 for different QQ versions are different.

In Block 203, associate the intercepted first image and the intercepted second image with the network account of the user; when monitoring that the network account is logged in, push the first image and the second image as content of the data card of the network account to the client for displaying.

Particularly, associating the intercepted first image and the intercepted second image with the network account of the user also includes:

associating the intercepted second image with a version number of the software, and then associating the first image, the associated second image and the version number of the software with the network account of the user; when monitoring that the network account is logged in, detecting the version number of the software used by the network account; according to the detected version number of the software, pushing the first image and the second image associated with the version number of the software as content of the data card of the network account to the client for displaying.

Preferably, associating the intercepted second image with the version number of the software, and then associating the first image, the associated second image and the version number of the software with the network account of the user includes:

compressing the intercepted first image as an image with a preset size (schematically, the preset size may be 130 pixels 130 pixels, 80 pixels 80 pixels, or 40 pixels 40 pixels);

compressing the intercepted second image as a compression package, and naming the compression package by the corresponding version number of the software;

associating the compressed first image and the compression package named by the version number of the software with the network account of the user.

Table 1 illustrates the correspondence between the first image and the compression package named by the version number of the software in terms of different network accounts. Due to the different versions of the software, the corresponding compression packages of the second image are different, thus each network account and the first image may correspond to a plurality of compression packages, as shown in Table 1.

TABLE 1

| Network account | Compressed first image | Compression package named by the version number of the software |
|---|---|---|
| 123 | Image 1 | Mobile phone QQ 4.2 version.zip PC QQ 1.96 version.zip |
| | | . . . |
| 456 | Image 2 | Mobile phone QQ 4.2 version.zip PC QQ 1.96 version.zip |
| | | . . . |
| . . . | . . . | . . . |

It should be noted that after the compression processing of the first image, the compressed first image is pushed to the client as the avatar of the data card in the example. However, the original picture of the first image is still stored in the server. When the user of the client clicks the compressed first image or hover the mouse over the compressed first image, the server pushes the original picture of the first image to the client for displaying, so as to enable the user to see a clearer avatar.

Because the first image is intercepted from the original picture, after the first image is compressed (the area compression ratio of the compressed image over the first image is 1:5, much higher than the area compression ratio of the compressed image over the original picture 1:50), the compressed first image is still able to keep higher clarity. However, the prior art is to directly compress the original picture. Since both the first image and the second image are included in the original picture, after the original picture is compressed (the area compression ratio of the compressed image over the original picture is 1:50), the clarity of the first image becomes lower.

Optionally, associating the intercepted second image with the version number of the software, and then associating the first image, the associated second image and the version number of the software with the network account of the user also includes:

storing the version number of the software and the network account of the user in a first preset-format file, for example, a text file;

storing the first image and the second image in a second preset-format file, for example, a thumbnail and/or an image list;

after detecting that the first image and the second image are clicked, entering the first preset-format file; when detecting that a certain version number of the software and the network account of the user in the first preset-format file are clicked, associating the version number of the software and the network account of the user with the clicked first image and the clicked second image.

Further, in the example, pushing the first image and the second image as content of the data card of the network account to the client for displaying includes:

according to the location of the first image in the picture, mixing and pushing the first image and the second image as the content of the data card of the network account to the client for displaying.

Figure 6A:
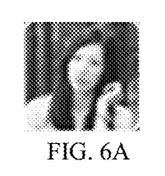
FIG. 6A, FIG. 6B and FIG. 6C are schematic diagrams illustrating merging and displaying an avatar of the data card and a background image of the data card according to the first example of the present disclosure.
Figure 6B:
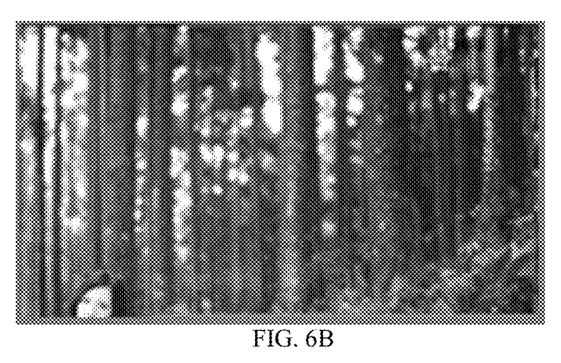
Figure 6C:
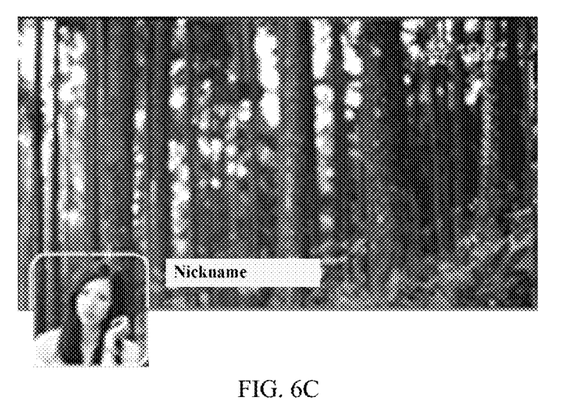

Schematically, FIG. 6A is the avatar of the data card, FIG. 6B is the background image of the data card, FIG. 6C is the displayed image after mixing, i.e., adaptively displaying the avatar of the data card and the background image of the data card in accordance with the location of the avatar of the data card in the original picture.

Optionally, in the example, pushing the first image and the second image as content of the data card of the network account to the client for displaying also includes:

pushing the first image and the second image as content of the data card of the network account to the client; according to the location of the first image in the picture (the client may store one copy of the picture after shooting), mixing and displaying the first image and the second image.

It should be noted that, in the example, the first image may refer to a certain image, and the second image may refer to a different image from the first image. "first" and "second" are used herein only to differentiate, state and refer to different images for convenience, but not meaning there should be one corresponding first image and one corresponding second image in the implementation of the present disclosure.

Figure 7:
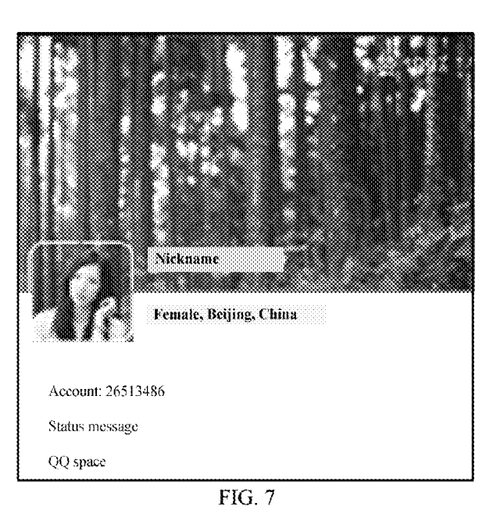
FIG. 7 is a schematic diagram illustrating displaying an avatar of the data card and a background image of the data card according to the first example of the present disclosure.

The method provided by the present disclosure can mix the avatar of the data card and the background image of the data card together, and display more information related to the avatar of the data card by the background image of the data card. As shown in FIG. 7, the avatar of the data card and the background image of the data card are mixed together according to the same original picture. In addition, because the background image of the data card is intercepted based on the typesetting and layout of different versions of data cards, the avatar of the data card and the background image of the data card can be adaptively displayed, so that it can effectively solve the problem of displaying the avatar of the data card and the background image of the data card in dislocation after the avatar of the data card is updated by the user, which may be caused by different layout of the data card available in different versions of the software.

SECOND EXAMPLE

Figure 8:
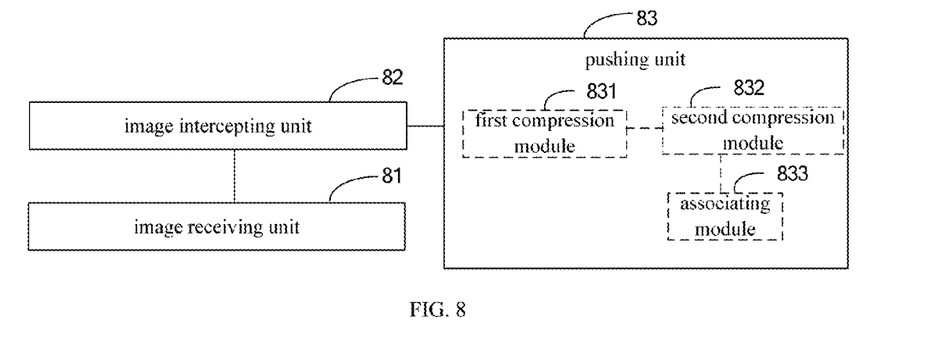
FIG. 8 is a schematic diagram illustrating a structure of an apparatus for displaying an image according to a second example of the present disclosure.

FIG. 8 is a schematic diagram illustrating a structure of an apparatus for displaying an image according to a second example of the present disclosure. For ease of description, only the elements related to the examples of the present disclosure are shown hereinafter.

The apparatus for displaying an image may be a software unit, a hardware unit or a combined software and hardware unit operating in the network-side device, for example, a server, or may be an individual accessory, which is integrated into the network-side device or operating in the application system of the network-side device.

The apparatus for displaying an image includes a picture receiving unit 81, an image intercepting unit 82 and a pushing unit 83, wherein:

the image receiving unit 81, is configured to receive a picture uploaded by a client;

the image intercepting unit 82, is configured to intercept a first image and a second image from the picture received by the image receiving unit 81;

the pushing unit 83, is configured to associate the first image and the second image intercepted by the image intercepting unit 82 with the network account of the user; when monitoring that the network account is logged in, push the first image and the second image as content of the data card of the network account to the client for displaying.

Further, the image intercepting unit 82 is configured to according to typesetting and layout of the data card in different versions of the software used by the network account, intercept the corresponding second image from the picture.

Further, the pushing unit 83 is configured to associate the intercepted second image with a version number of the software, and then associate the first image, the associated second image and the version number of the software with the network account of the user; when monitoring that the network account is logged in, detect the version number of the software used by the network account; according to the detected version number of the software, push the first image and the second image associated with the version number of the software as content of the data card of the network account to the client for displaying.

Further, the pushing unit 83 includes:

a first compression module 831, configured to compress the intercepted first image as an image with a preset size;

a second compression module 832, configured to compress the intercepted second image as a compression package, and name the compression package by the corresponding version number of the software;

an associating module 833, configured to associate the compressed first image and the compression package named by the version number of the software with the network account of the user.

Schematically, the uploaded picture is obtained by shooting via a camera of the client after the instruction of updating the avatar and cover sent by the user is received by the client.

Further, the pushing unit 83 is configured to according to the location of the first image in the picture, mix the first image and the second image, and push the mixed image as the content of the data card of the network account to the client for displaying.

Preferably, the first image is the avatar of the data card, and the second image is the background image of the data card.

It will be apparently understood for those skilled in the art that for sake of convenience and brevity of the description, the aforementioned division of functional units and modules are described only by way of example. In practical implementation, the aforementioned functionality can be distributed to different functional units and modules to perform based on needs, i.e., the internal structure of the apparatus can be divided into different functional units and modules to achieve all or part of the aforementioned functions. All the functional units and modules as described in the examples may be integrated into one processing unit, or stand alone, or two or more units are integrated into one unit. The integrated units or modules can be implemented in the form of hardware or software function unit. In addition, specific names of all the functional units and modules are only used to distinguish one from another, but not to limit the scope of the present disclosure. The specific operation process of the units and modules in the above-described apparatus may be referred to the corresponding process in the aforementioned method examples, which is not described in detail herein.

THIRD EXAMPLE

Figure 9:
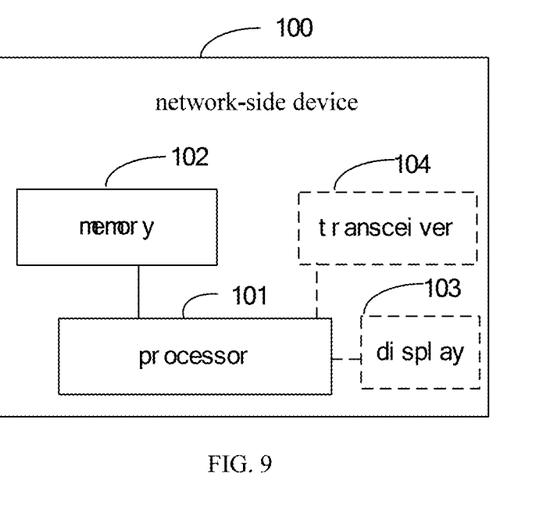
FIG. 9 is a schematic diagram illustrating a structure of a network-side device according to a third example of the present disclosure.

FIG. 9 is a schematic diagram illustrating a structure of a network-side device according to a third example of the present disclosure. The network-side device provided by the example of the present disclosure may be used to implement the method of the corresponding example in FIG. 2. For ease of description, only the parts related to the examples of the present disclosure are shown.

The network-side device 100 includes one or more processors 101 to process the core (only one is shown in FIG. 9), and one or more memories 102 with computer-readable storage medium (only one is shown in FIG. 9).

The memory 102 is configured to store software programs and modules, such as the program instructions/modules corresponding to the method/apparatus for displaying a message in the above-described examples. The processor 101 can perform various functional applications and data processing by operating the software programs and modules stored in the memory 102, i.e., achieving the mixing and adaptively displaying of the avatar of the data card and the background image of the data card. The memory 102 may include high speed random access memory and non-volatile memory, such as one and more magnetic storage apparatuses, flash memory or other non-volatile solid state memory, and others.

The processor 101 is the control center of the network-side device 100, to connect all the elements in the network-side device 100 by various interfaces and links, and perform various functions and data processing of the network-side device 100 by operating or executing the software programs and/or modules stored in the memory 102 and calling the data stored in the memory 102, so as to monitor the network-side device 100 as a whole. Optionally, the processor 101 may include one and more processing units, and may also integrate an application processor and a modem, in which the application processor is to process an operation system, a user interface and application programs, etc., and the modem is to process wireless communication. It will be understood that the above mentioned modem may not be integrated into the processor 101.

It should be noted that those skilled in the art may understand that the network-side device 100 may also include a display 103 and a transceiver 104. The display 103 may be used to display an interaction interface with the user during image processing. The transceiver 104 may be used to receive or transmit the relevant picture or data during image processing. The processor 101 is connected with the memory 102, the display 103, and the transceiver 104 separately.

In the example, the network-side device 100 includes one or more processors, a memory, and one or more programs, wherein the one or more programs are stored in the memory, and configured for execution by the one or more processors, the one or more programs including instructions to:

receive a picture uploaded by a client;

intercept a first image and a second image from the picture;

associate the intercepted first image and the intercepted second image with a network account of a user; when monitoring that the network account is logged in, push the first image and the second image as content of a data card of the network account to the client for displaying.

In a second implementation provided based on the first implementation, the memory of the user device also includes instructions to:

according to typesetting and layout of the data card in different versions of the software used by the network account, intercept the corresponding second image from the picture.

In a third implementation provided based on the second implementation, the memory of the user device also includes instructions to:

associate the intercepted second image with a version number of the software, and then associate the first image, the associated second image and the version number of the software with the network account of the user; and when monitoring that the network account is logged in, detect the version number of the software used by the network account; according to the detected version number of the software, push the first image and the second image associated with the version number of the software as content of the data card of the network account to the client for displaying.

In a fourth implementation provided based on the third implementation, the memory of the user device also includes instructions to:

compress the intercepted first image as an image with a preset size;

compress the intercepted second image as a compression package, and name the compression package by the corresponding version number of the software;

associate the compressed first image and the compression package named by the version number of the software with the network account of the user.

In a fifth implementation provided based on the first implementation, the memory of the user device also includes instructions to:

obtain the uploaded picture by shooting via a camera of the client after the instruction of updating the avatar and cover sent by the user is received by the client.

In a sixth implementation provided based on the first implementation, the memory of the user device also includes instructions to:

according to the location of the first image in the picture, mix the first image and the second image, and push the mixed image as the content of the data card of the network account to the client for displaying.

In a seventh implementation provided based on the first/second/third/fourth/fifth/sixth implementation, the memory of the user device also includes instructions to:

set the first image to be the avatar of the data card, and the second image to be the background image of the data card.

According to the examples of the present disclosure, the first image and the second image are intercepted on the same picture, and the intercepted first image and the intercepted second image are pushed as content of the data card to the client for displaying. Since the first image and the second image are intercepted from the same picture, when one image is the avatar of the data card, and the other image is the background image of the data card, it enables to mix the avatar of the data card and the background image of the data card together, and display more information related to the avatar of the data card by the background image of the data card. In addition, because the background image of the data card is intercepted based on the typesetting and layout of different versions of data cards, the avatar of the data card and the background image of the data card can be adaptively displayed, so that it can effectively solve the problem of displaying the avatar of the data card and the background image of the data card in dislocation after the avatar of the data card is updated by the user, which may be caused by different layout of the data card available in different versions of the software.

Those skilled in the art may understand that part or all of the steps to implement the above-described examples may be accomplished by hardwares instructed by the programs. The programs may be stored within a computer-readable storage medium. The computer-readable storage medium may be a read-only memory (ROM), random-access memory (RAM), magnetic disk, or light disk, etc.

The foregoing is further detained description in combination with preferred examples of the present disclosure, which is not used for limiting the scope of the present disclosure. For those skilled in the art, any equivalent substitutions or obvious variations made without departing the principle of the present disclosure, with the same performance or purpose, should be covered by the p scope of the present disclosure, which is defined in the accompanying claims.

What is claimed is:

1. A method for displaying an image, comprising:
   receiving a picture uploaded by a client;
   intercepting a first image and a second image from the picture; and
   associating the intercepted first image and the intercepted second image with a network account of a user; when monitoring that the network account is logged in, pushing the first image and the second image as content of a data card of the network account to a client for displaying;
   wherein intercepting the second image from the picture comprises:
   according to typesetting and layout of the data card in different versions of a software used by the network account, intercepting the corresponding second image from the picture;
   wherein associating the intercepted first image and the intercepted second image with the network account of the user comprises:
   associating the intercepted second image with a version number of the software, and then associating the first image, the associated second image and the version number of the software with the network account of the user; and
   wherein when monitoring that the network account is logged in, pushing the first image and the second image as content of the data card of the network account to a client for displaying comprises:
   when monitoring that the network account is logged in, detecting the version number of the software used by the network account; according to the detected version number of the software, pushing the first image and the second image associated with the version number of the software as content of the data card of the network account to the client for displaying.

2. The method according to claim 1, wherein associating the intercepted second image with the version number of the software, and then associating the first image, the associated second image and the version number of the software with the network account of the user comprises:
   compressing the intercepted first image as an image with a preset size;
   compressing the intercepted second image as a compression package, and naming the compression package by the corresponding version number of the software; and
   associating the compressed first image and the compression package named by the version number of the software with the network account of the user.

3. The method according to claim 1, wherein associating the intercepted second image with the version number of the software, and then associating the first image, the associated second image and the version number of the software with the network account of the user further comprises:
   storing the version number of the software and the network account of the user in a first preset-format file;
   storing the first image and the second image in a second preset-format file; and
   after detecting that the first image and the second image are clicked, entering the first preset-format file; when detecting that the version number of the software and the network account of the user in the first preset-format file are clicked, associating the version number of the software and the network account of the user with the clicked first image and the clicked second image.

4. The method according to claim 1, wherein the uploaded picture is obtained by shooting via a camera of the client after an instruction of updating an avatar and a background given by the user is received by the client.

5. The method according to claim 1, wherein pushing the first image and the second image as content of the data card of the network account to the client for displaying comprises:
   according to a location of the first image in the picture, mixing and pushing the first image and the second image as the content of the data card of the network account to the client for displaying.

6. The method according to claim 1, wherein the first image is the avatar of the data card, and the second image is a background image of the data card.

7. An apparatus for displaying an image, comprising: a processor and a non-volatile memory, wherein the non-volatile memory stores one or more computer readable instructions, and the processor executes the computer readable instructions stored in the non-volatile memory to
   receive a picture uploaded by a client;
   intercept a first image and a second image from the picture; and
   associate the intercepted first image and the intercepted second image with a network account of a user; when monitoring that the network account is logged in, push the first image and the second image as content of a data card of the network account to a client for displaying;
   wherein the processor executes the computer readable instructions stored in the non-volatile memory to according to typesetting and layout of the data card in different versions of a software used by the network account, intercept the corresponding second image from the picture;
   wherein the processor executes the computer readable instructions stored in the non-volatile memory to associate the intercepted second image with a version number of the software, and then associate the first image, the associated second image and the version number of the software with the network account of the user; and when monitoring that the network account is logged in, detect the version number of the software used by the network account; according to the detected version number of the software, push the first image and the second image associated with the version number of the software as content of the data card of the network account to the client for displaying.

8. The apparatus according to claim 7, wherein the processor executes the computer readable instructions stored in the non-volatile memory to:
compress the intercepted first image as an image with a preset size;
compress the intercepted second image as a compression package, and name the compression package by the corresponding version number of the software; and
associate the compressed first image and the compression package named by the version number of the software with the network account of the user.

9. The apparatus according to claim 7, wherein the processor executes the computer readable instructions stored in the non-volatile memory to
store the version number of the software and the network account of the user in a first preset-format file;
store the first image and the second image in a second preset-format file; and
after detecting that the first image and the second image are clicked, enter the first preset-format file; when detecting that the version number of the software and the network account of the user in the first preset-format file are clicked, associate the version number of the software and the network account of the user with the clicked first image and the clicked second image.

10. The apparatus according to claim 7, wherein the uploaded picture is obtained by shooting via a camera of the client after an instruction of updating an avatar and a background given by the user is received by the client.

11. The apparatus according to claim 7, wherein the processor executes the computer readable instructions stored in the non-volatile memory to according to a location of the first image in the picture, mix and push the first image and the second image as the content of the data card of the network account to the client for displaying.

12. The apparatus according to claim 7, wherein the first image is the avatar of the data card, and the second image is a background image of the data card.

\* \* \* \* \*